United States Patent
Paatelma (10) Patent No.: US 6,463,042 B1
(45) Date of Patent: Oct. 8, 2002

(54) MOBILE STATION HAVING POWER SAVING MODE FOR PACKET DATA

(75) Inventor: Risto Paatelma, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/321,976

(22) Filed: May 28, 1999

(51) Int. Cl.[7] .............................................. H04B 7/185

(52) U.S. Cl. ...................... 370/318; 370/328; 370/311; 370/338

(58) Field of Search ................................. 370/313, 314, 370/318, 321, 328, 336, 337, 338, 345, 349, 311; 455/522

(56) References Cited

U.S. PATENT DOCUMENTS

| | | | |
|---|---|---|---|
| 5,257,257 A | 10/1993 | Chen et al. .................... | 370/18 |
| 5,640,395 A | 6/1997 | Hamalainen et al. ........ | 370/322 |
| 5,828,662 A * | 10/1998 | Jalali et al. .................. | 370/335 |
| 5,995,496 A * | 11/1999 | Honkasalo et al. ......... | 370/318 |
| 6,031,827 A * | 2/2000 | Rikkinen et al. ............ | 370/330 |
| 6,091,717 A * | 7/2000 | Honkasalo et al. ......... | 370/329 |
| 6,359,904 B1 * | 3/2002 | Hamalainen et al. ....... | 370/469 |

\* cited by examiner

*Primary Examiner*—Vivian Chin
*Assistant Examiner*—John J Lee
(74) *Attorney, Agent, or Firm*—Harrington & Smith, LLP (57) ABSTRACT

A method for operating a wireless terminal in a wireless communication system that operates with frames time divided into slots each having a Header portion followed by a Data portion. The system is arranged to transmit a downlink slot so that the Header portion is transmitted at a higher power level than the Data portion when the Data portion does not contain valid data so as to reduce system interference. This is known as a Quasi-Discontinuous Transmission (Q-DTX) mode of operation. The method includes steps of (A) receiving all or a part of the Header portion and only a part of the Data portion of a slot and detecting whether the Header portion was transmitted at a higher power level than the Data portion is being transmitted; and (B) if it is detected that the Header portion was transmitted at a higher power level than the Data portion is being transmitted, terminating the reception of a remaining part of the slot and placing at least a portion of the wireless terminal in a reduced power consumption state. Otherwise, if it is detected that the Header portion was transmitted at the same power level as the Data portion is being transmitted, continuing to receive the remaining part of the slot.

14 Claims, 6 Drawing Sheets

MOBILE STATION HAVING POWER SAVING MODE FOR PACKET DATA

FIELD OF THE INVENTION:

This invention relates generally to radiotelephones and, in particular, to wireless terminals or mobile stations that are capable of operation with a wireless network having packet data capability.

BACKGROUND OF THE INVENTION

In a GPRS-136 packet data mode of operation (and possibly in others) a wireless terminal may not know if a particular received time slot (referred to herein as a downlink time slot) is directed to the wireless terminal or to some other wireless terminal. As such, the downlink time slot must be completely received and the data detected in order for the wireless terminal to determine, from information relating to the upper protocol layer(s), the intended recipient for the slot.

The same is true even for the case where the transmitting base station does not have data to transmit to the wireless terminals served by the base station, in which case the base station may simply transmit random data that is not addressed to any particular wireless terminal. However, unless the wireless terminals actually receive and decode such a slot, they will not know if the slot contains valid data that is addressed to them.

As can be appreciated, the requirement to completely receive and then decode the downlink time slots can have a detrimental impact on the battery life of the wireless terminal.

Figure 1:
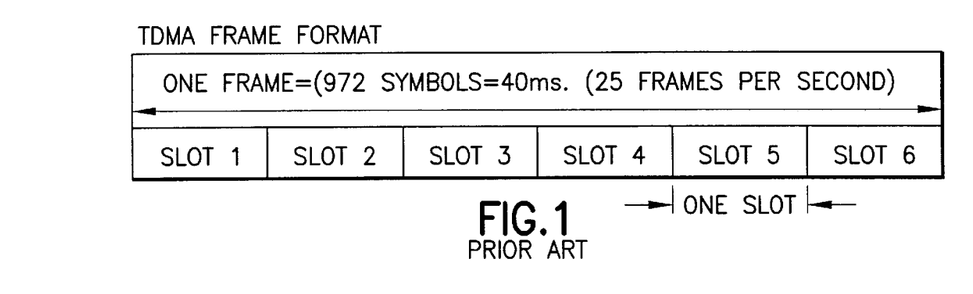
FIGS. 1, 2 and 3 illustrate a conventional TDMA frame format, a downlink packet data channel (PDCH) slot structure using π/4-DQPSK modulation, and the downlink PDCH slot structure using 8-PSK modulation, respectively.
Figure 2:
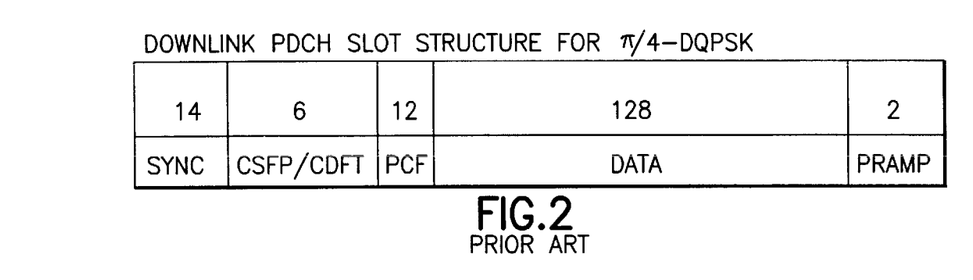
Figure 3:
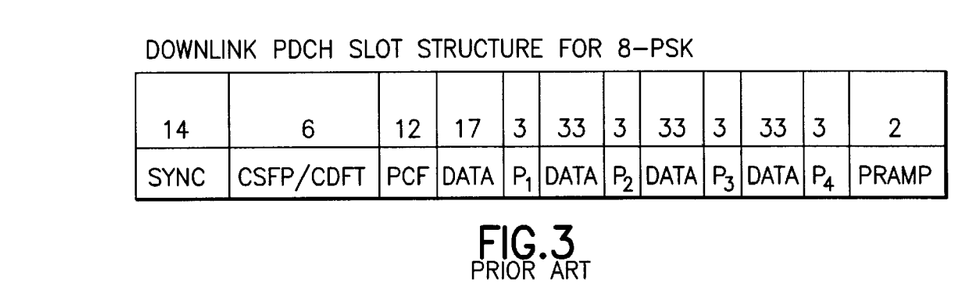

FIGS. 1, 2 and 3 illustrate a conventional TDMA frame format, a down link packet data channel (PDCH) slot structure when using π/4-DQPSK modulation, and the downlink PDCH slot structure using 8-PSK modulation, respectively. Each slot is assumed to have a duration of about 6.67 milliseconds. The CSFP/CDFT is used to convey a five bit Superframe Phase (SFP) value and a three bit Data Frame Type (DFT) value. The 14 symbol synchronization (SYNC) field, six symbol CSFP/CDFT field, and 12 symbol Packet Control Field (PCF) together form a 32 symbol slot Header portion, from which the recipient of the slot can be ascertained by a receiver. The 32 symbol Header portion is followed by a 130 symbol data portion. In this embodiment the 32 symbol Header portion is always modulated using π/4-DQPSK, while the remaining portion of the slot can be modulated using either π/4-DQPSK or 8-PSK.

It is known that in order to reduce interference a base station can lower the transmitted power of the slot following the Header portion, for the case where the base station has no data to transmit to wireless terminals.

More particularly, a Quasi-Discontinuous Transmission (Q-DTX) is a form of downlink power control that allows the base station to reduce its output power during a portion of each downlink time slot in order to reduce the interference in the system. Reference can be had to TIA/EIA-136-331 for the cases where Q-DTX based power reduction may be applied to the downlink of a PDCH. For the cases where Q-DTX based power reduction may be applied the base station may only invoke it for those PDCH downlink slots where it has nothing to send.

The slot Header portion of a downlink time slot is not subject to Q-DTX. When Q-DTX based power reduction is allowed it may therefore only be applied to the portion of a downlink slot following the slot Header portion.

However, while this technique may reduce system interference and may also lower the base station's power consumption (which is normally not as an important a consideration as reducing the wireless terminal's power consumption), it will have no effect on reducing the power consumption of the wireless terminals that receive a PDCH from the base station.

OBJECTS AND ADVANTAGES OF THE INVENTION

It is thus a first object and advantage of this invention to provide an improved method for reducing the power consumption of a wireless terminal that receives packet data from a base station.

It is another object and advantage of this invention to employ the Quasi-Discontinuous Transmission (Q-DTX) mode of operation of the base station so as to detect when the base station is not transmitting valid packet data, so as to reduce the power consumption of the wireless terminal.

It is a further object and advantage of this invention to employ the Quasi-Discontinuous Transmission (Q-DTX) mode of operation of the base station so as to terminate the reception and decoding of a particular downlink time slot prior to the end of the time slot, when the base station is not transmitting valid packet data, thereby enabling a reduction in the power consumption of the wireless terminal.

SUMMARY OF THE INVENTION

The foregoing and other problems are overcome and the objects and advantages are realized by methods and apparatus in accordance with embodiments of this invention.

A method is disclosed for operating a wireless terminal in a wireless communication system that operates with frames time divided into slots each having a Header portion followed by a Data portion. The system is arranged to transmit a downlink slot so that the Header portion is transmitted at a higher power level than the Data portion when the Data portion does not contain valid data so as to reduce system interference. This is known as a Quasi-Discontinuous Transmission (Q-DTX) mode of operation. The method includes steps of (A) receiving all of the Header portion and only a part of the Data portion of a slot and detecting whether the Header portion was transmitted at a higher power level than the Data portion is being transmitted; and (B) if it is detected that the Header portion was transmitted at a higher power level than the Data portion is being transmitted, terminating the reception of a remaining part of the slot and placing at least a portion of the wireless terminal in a reduced power consumption state. Otherwise, if it is detected that the Header portion was transmitted at the same power level as the Data portion is being transmitted, continuing to receive the remaining part of the slot.

More particularly, the method includes a first step of performing a channel estimation in a forward direction over at least some symbols of a received Header portion to derive a first channel estimate ($EST_1$) at the end of the Header portion; and a second step of performing a channel estimation in a reverse direction over a subset of symbols of the Data portion so as to derive a second channel estimate ($EST_2$) at the beginning of the Data portion. A next step obtains a ratio of the derived channel estimates ($EST_1$/$EST_2$), and a further step compares the ratio to a threshold value to determine if the Data portion contains valid data.

If the Data portion is determined not to contain valid data, the method places at least a receiver of the wireless terminal in a reduced power consumption state for a remainder of at least the current slot, while if the ratio is determined to be about unity the Data portion is assumed to contain valid data, and a receiver of the wireless terminal is left in a fully powered, operational state to receive the remainder of the current slot.

The steps of estimating may use a Least Mean Squares (LMS) channel estimator, although other channel estimation techniques could be used as well. In one embodiment the threshold value is fixed during the operation of the wireless terminal, while in another embodiment the threshold value is made variable during the operation of the wireless terminal so as to have a value that is a function of at least one influencing factor. The at least one influencing factor can be selected from at least one of a velocity of the wireless terminal or an amount of noise and/or interference in the channel.

In a further embodiment the method the method first makes a determination as to whether a last received N slots contained valid packet data for the wireless terminal. If the determination is in the affirmative, the wireless terminal receives an entire next slot, as it is assumed that the probability is increased that the next slot will contain valid packet data for the wireless terminal. Otherwise, if the determination is in the negative, the method begins to receive the next slot and performs the above described channel estimation in a forward direction, followed by the other steps.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 4:
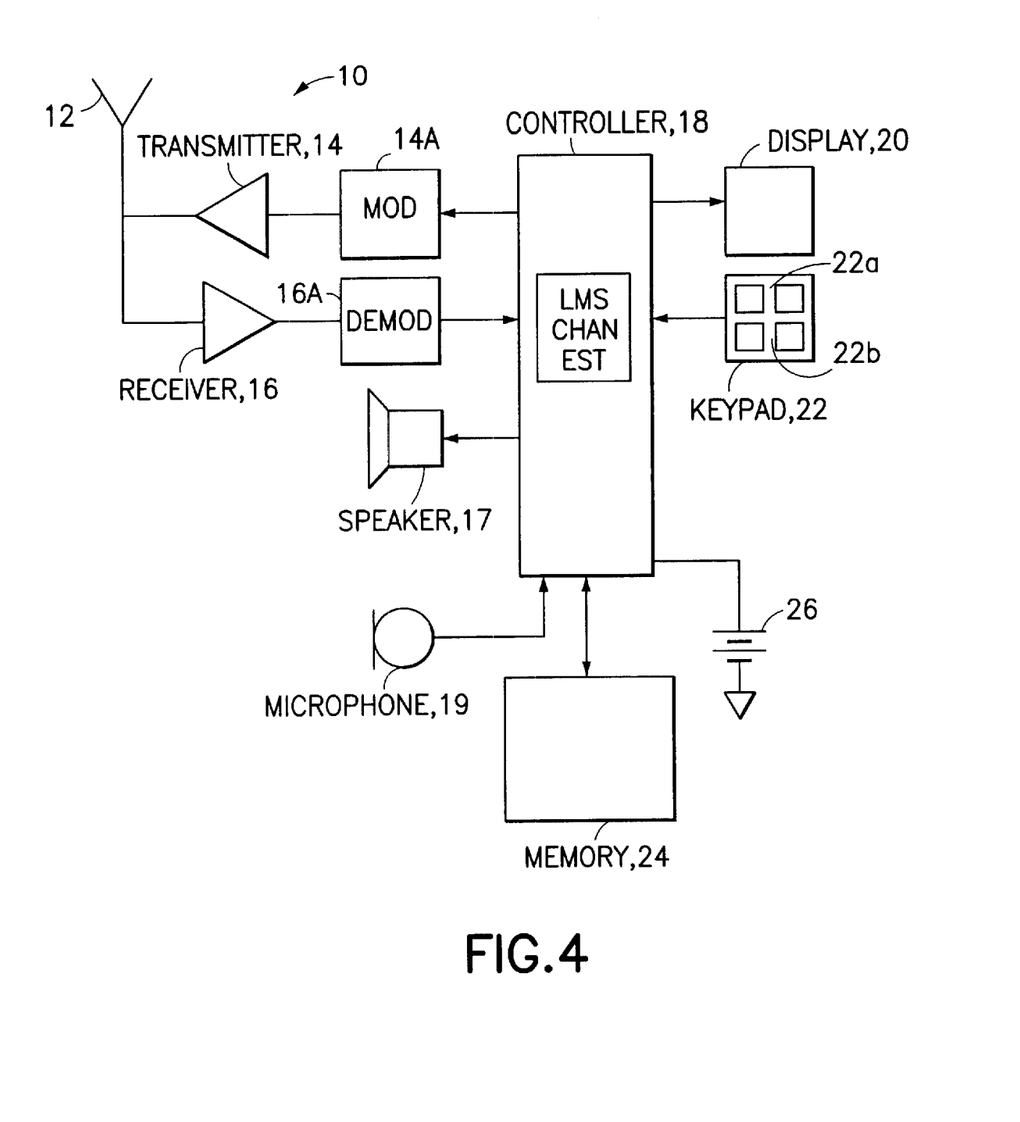
FIG. 4 is a block diagram of a wireless terminal or mobile station that is constructed and operated in accordance with this invention.
Figure 5:
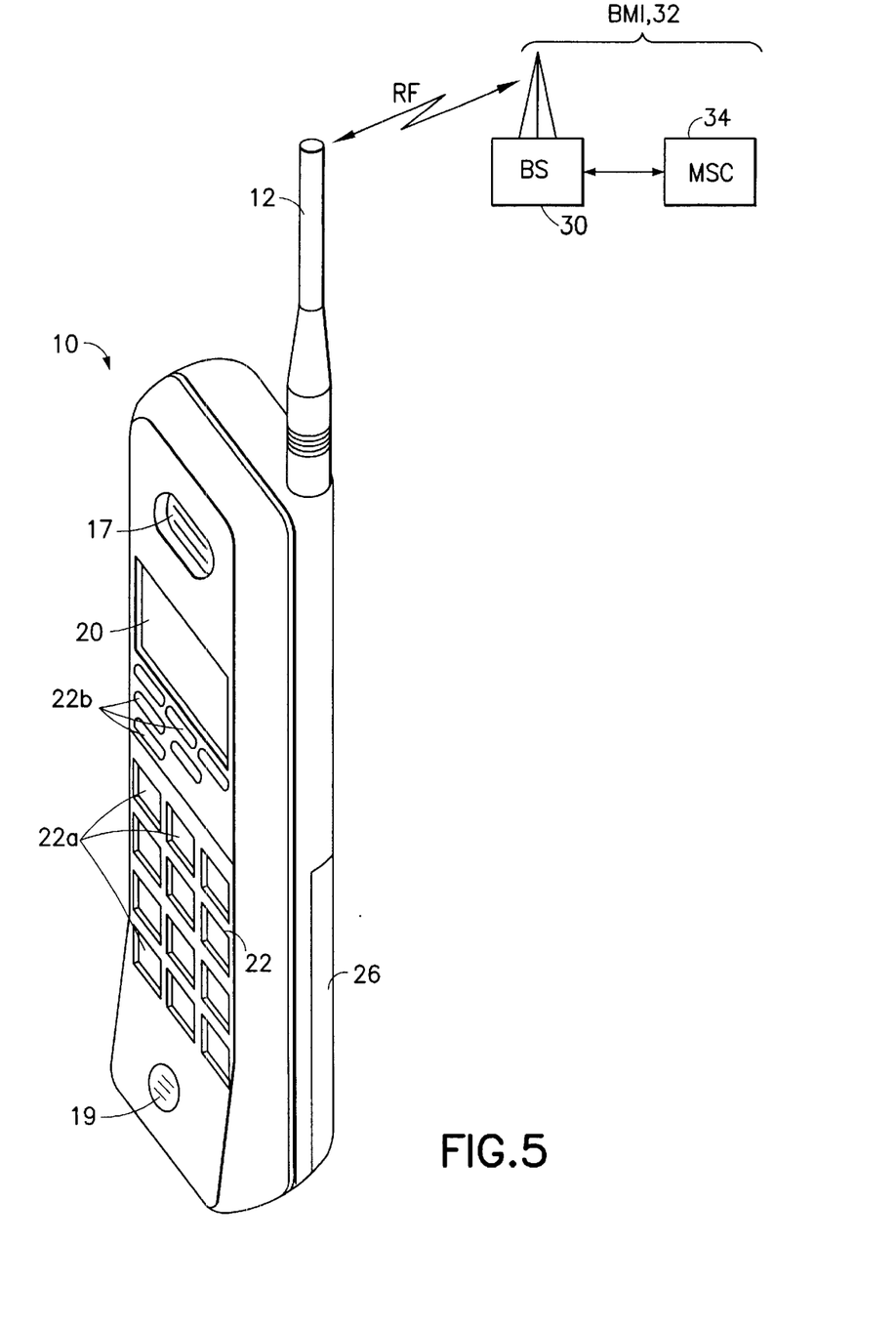
FIG. 5 is an elevational view of the mobile station shown in FIG. 4, and which further illustrates a wireless communication system to which the mobile station is bidirectionally coupled through wireless RF links.

Reference is made to FIGS. 4 and 5 for illustrating a wireless user terminal or mobile station 10, such as but not limited to a cellular radiotelephone, data terminal or a personal communicator, that is suitable for practicing this invention. The mobile station 10 includes an antenna 12 for transmitting signals to and for receiving signals from a base site or base station 30. The base station 30 is a part of a wireless network comprising a Base Station/Mobile Switching Center/Interworking function (BMI) 32 that includes a mobile switching center (MSC) 34. The MSC 34 provides a connection to landline trunks when the mobile station 10 is involved in a call. The BMI 32 is assumed for the purposes of this invention to have a TDMA slot structure as shown in FIGS. 1–3, or a similar structure, and to thus be capable of transmitting packet data to the mobile station 10.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable wireless communication system, the packet data, and possibly also speech signals. As was noted, the air interface standard is assumed for this invention to include a physical and logical frame structure of a type that was described above, although the teaching of this invention is not intended to be limited only to this specific structure.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various system parameters and the number assignment module (NAM). An operating program for controlling the operation of controller 18 is also stored in the memory 24 (typically in a ROM device). The memory 24 may also store data, including packet data, that is received from the BMI 32.

It should be understood that the mobile station 10 can be a vehicle mounted or a handheld device. Also, the mobile station 10 need not be mobile at all, but could be installed or used at a fixed location. It should further be appreciated that the mobile station 10 can be capable of operating with one or more air interface standards, modulation types, and access types.

The inventor has realized that the Q-DTX mode of operation can be used to detect when the base station 30 is transmitting random data, i.e., when the base station is not transmitting a valid packet to one of the mobile stations 10 served by the base station 30. As was discussed above, in the Q-DTX case the Header portion of the slot is transmitted at normal power while the remainder of the slot is transmitted at a reduced power level relative to the Header portion.

It is preferred in accordance with this invention to receive the entire 32 symbol Header portion (although less could be received), and then a relatively smaller part (e.g., 10 symbols) of the following 130 symbol data portion. If the detected power level of the received part of the data portion is significantly lower than the detected power level of the Header portion, then it is assumed that the Q-DTX mode is active and that the base station 30 is not transmitting valid packet data. If this is the case then at least the receiver 16, and possibly also the demodulator 16A and other circuits, of the mobile station 10 can be placed in a reduced power consumption state for the remainder of at least the current slot, thereby conserving power that is drawn from the battery 26. If instead the detected power level of the received part of the data portion is not significantly lower than the detected power level of the Header portion, it is assumed that the Q-DTX mode is not active and that the base station 30 is transmitting valid packet data. In this case the mobile station 10 can continue to receive the remainder of the slot in a normal manner.

A simplest method to perform the foregoing technique would be calculate the power of the received signal samples. However, simulations have shown that this may not be the most reliable technique, particularly in a channel that is experiencing rapid fades or other signal impairments.

Figure 6:
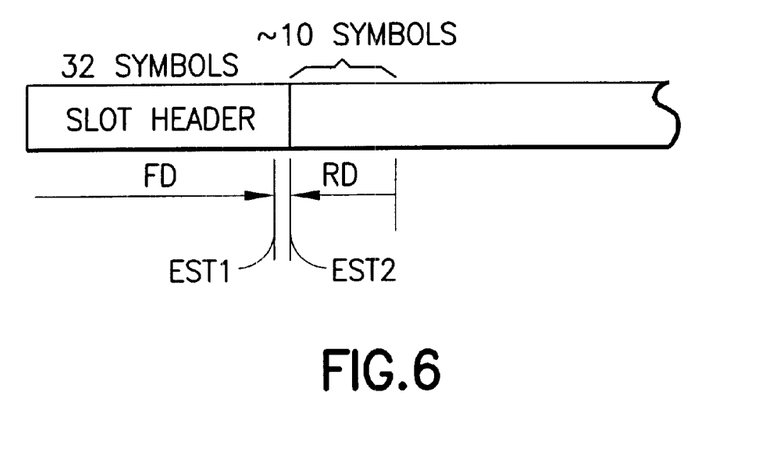
FIG. 6 illustrates a portion of downlink time slot of a PDCH, and is useful in explaining a reception technique of this invention.

A presently preferred technique is thus shown in FIG. 6, wherein the following steps are executed.

A. The mobile station 10 performs a channel estimation in the forward direction (FD) over the entire 32 symbol Header portion (although some fewer number of symbols could be used) to derive a first channel estimate ($EST_1$).

B. The mobile station 10 then performs a channel estimation in the reverse direction (RD) over some subset of symbols (e.g., 10 symbols) to the beginning of the data portion to derive a second channel estimate ($EST_2$). Note that the two channel estimates are separated by only a small interval of time, and should thus more accurately reflect the actual channel characteristics (i.e., the channel estimates should be less susceptible to the occurrence of a fast fade or some other signal impairment) than if the second channel estimate were also conducted in the forward direction.

C. A ratio of the two power estimates ($EST_1/EST_2$) is then compared to a threshold value. If the ratio is found to be about one (1) then it is assumed that the Q-DTX mode of operation is not in effect at the base station 30, and the remainder of the slot's data portion is received and decoded in a normal manner. If the ratio is instead some positive value that is somewhat greater than one, then the Q-DTX mode is assumed to be in operation, and at least the receiver 16 and the demodulator 16A are shut down or otherwise operated in a reduced power consumption mode for the remainder of at least the current slot.

It should be noted that the mobile station 10 is capable of decoding the incoming data stream and estimating the channel at a rate that is significantly faster than the incoming symbol rate. One suitable channel estimator is based on a Least Mean Squares (LMS) type, although other channel estimators could be used as well.

Figure 9A:
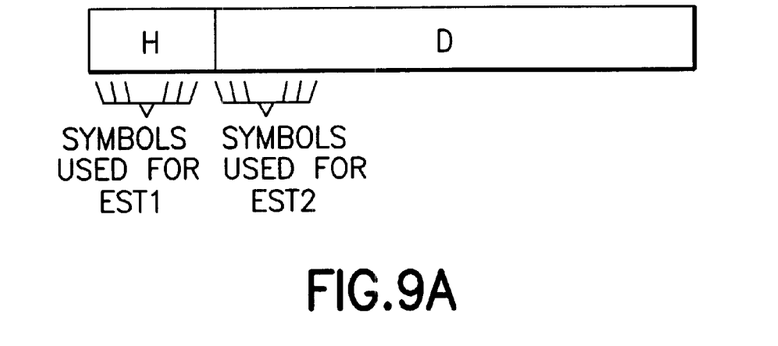
FIGS. 9A and 9B each show a portion of a time slot, and are useful in explaining the teachings of this invention.
Figure 9B:
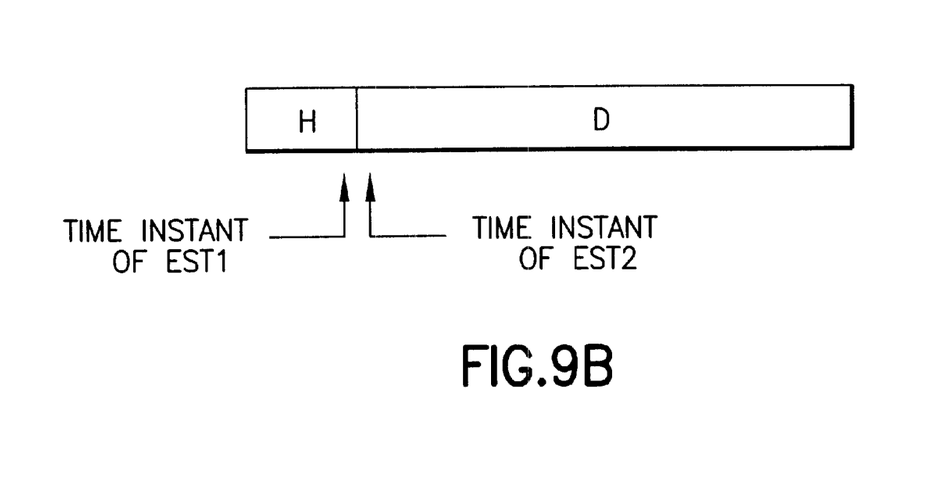

FIGS. 9A and 9B each show a portion of a time slot having a Header (H) portion and a Data (D) portion, and are useful in explaining the teachings of this invention. The previous references to channel estimation in the forward and reverse directions are most appropriate if one considers recursive channel estimation methods such LMS. However, in general it should be understood that EST1 refers to the power obtained by the channel estimation (by whatever means) using the header symbols only, and that the time instant of estimation is near to the border between the header and data portions. The EST2 is similar, but is calculated using only data symbols. It should be further understood that if N symbols are used (FIG. 9A), the value of N is preferably an implementation parameter, as are the locations of the actual time instants of estimation (FIG. 9B).

Figure 7:
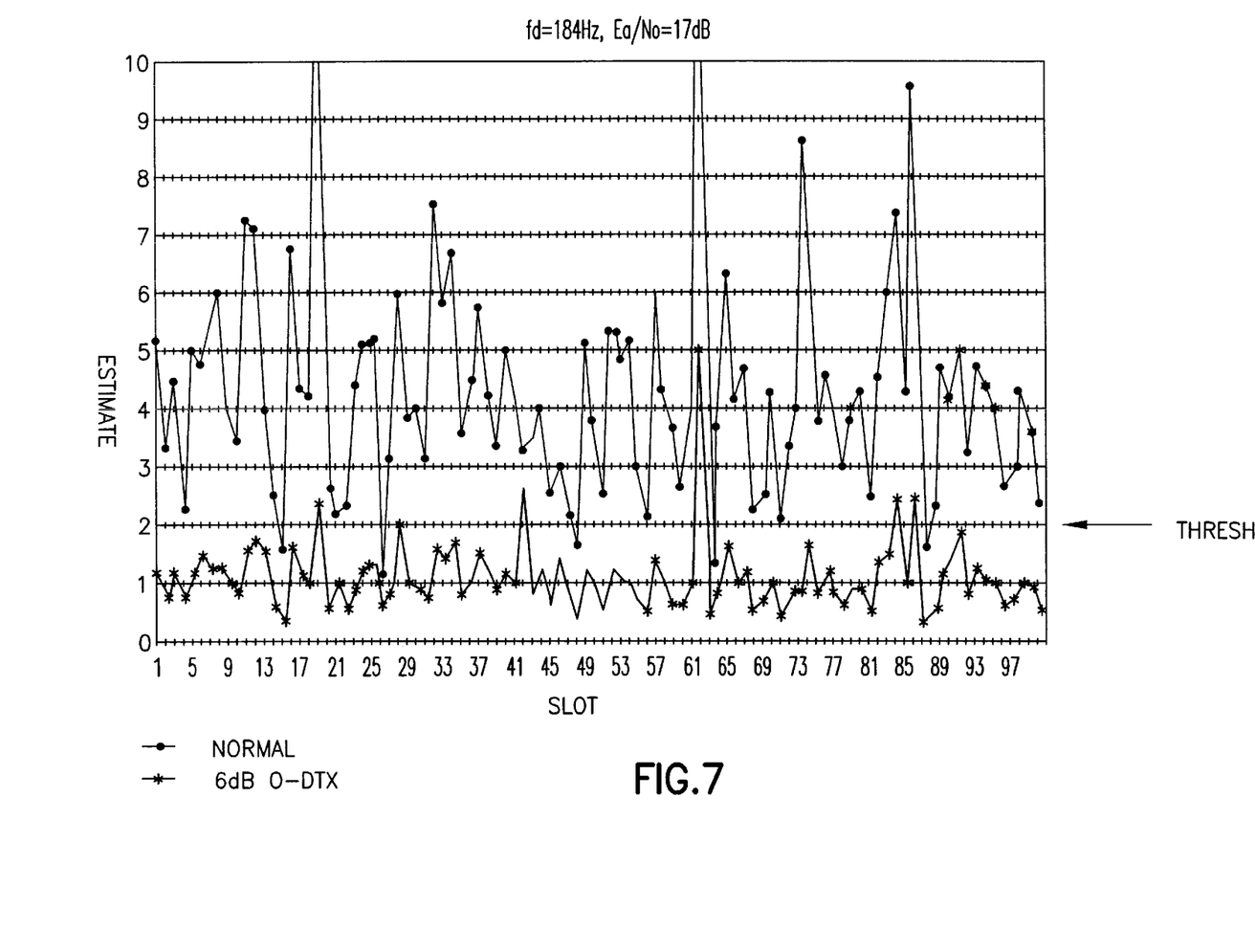
FIGS. 7 and 8 are graphs depicting the results of simulations of the teachings of this invention at a relatively high mobile station speed (FIG. 7) and at a somewhat lower mobile station speed (FIG. 8)
Figure 8:
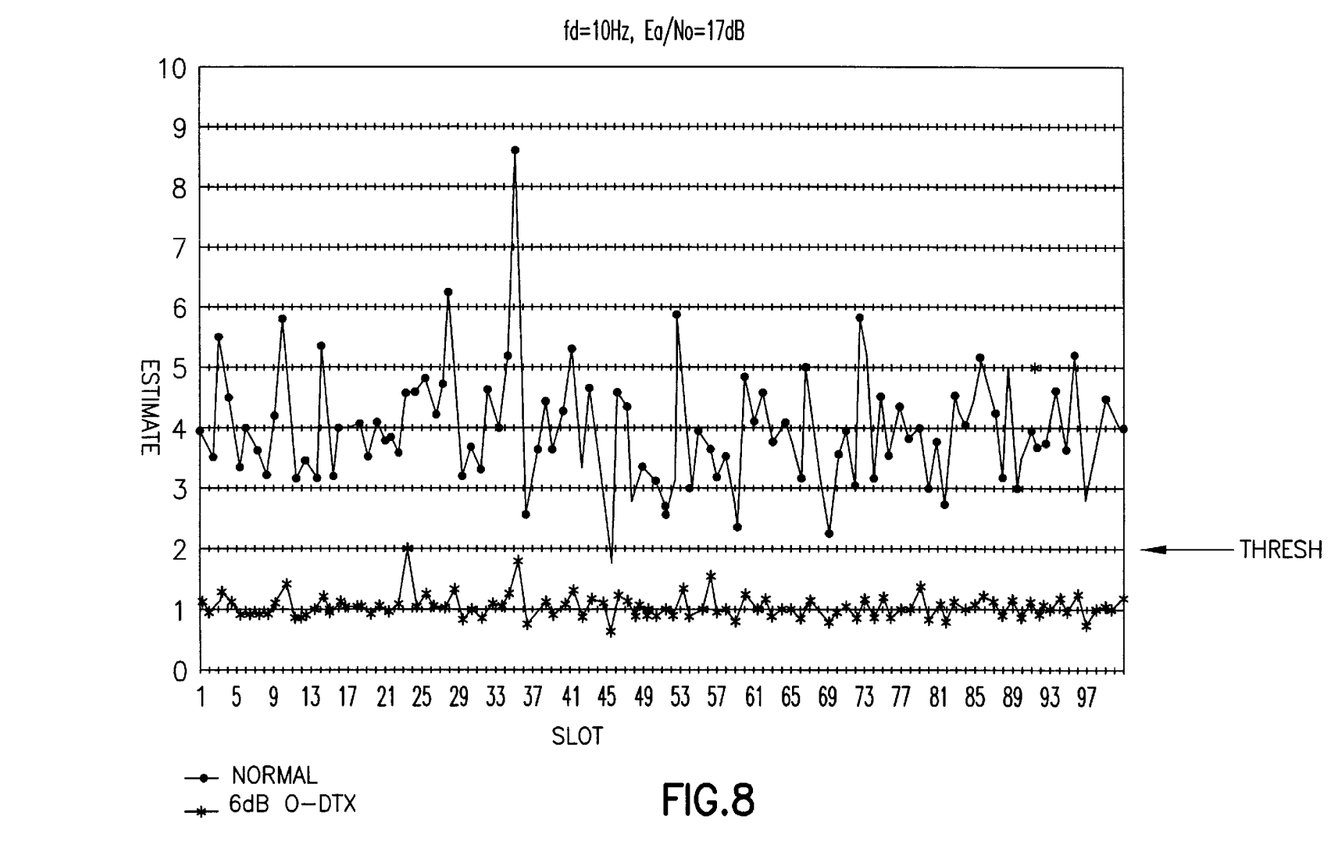

Simulations were performed in two different environments. A first one assumed a worst case speed $f_d$=184 Hz (Doppler shift), Es/No=17 dB, and a power difference equal to 6 dB (FIG. 7), while the other environment assumed a much more modest speed $f_d$=10 Hz (FIG. 8). The bottom trace of each Figure shows the case where Q-DTX is not active (the ratio of the two power estimates ($EST_1/EST_2$) is equal to about unity), while the upper trace shows the case where Q-DTX is active. These two Figures show that even in the worst case the accuracy of this method is suitable. This further implies that one can establish the threshold to which the ratio of the two power estimates ($EST_1/EST_2$) is compared, and which prevents the reception of Q-DTX slots but enables the reception of possible data slots. For example, if the threshold (THRESH) in FIGS. 7 and 8 were set to about 2, then most of the slot decisions (i.e., Q-DTX active/not active) would be accurate, particularly for the lower speed case of FIG. 8. However, even for those decisions that are incorrect, where the mobile station 10 shuts off its receiver 16 when valid packet data is being transmitted, the normal retransmission request error recovery protocols serve to prevent important packet data from being lost.

As such, the threshold can be a fixed threshold, or it can be made an adaptable threshold that varies as a function of, for example, velocity (either inferred or actually measured) and/or the channel noise and/or interference level.

The accuracy of this technique can be further improved by adhering to the following the following rule: If the previous N slots conveyed data for this mobile station, then receive all slots, else use the power saving technique of this invention.

The basis for this rule is grounded in the fact that most packets will consist of more than one slot. For example, a typical packet in a given application of interest may consist of 10 slots. As such, the last N slots contained packet data for this mobile station, where N is equal to or grater than one, then the probability is greater that the next slot will also contain packet data for this mobile station.

Although described in the context of preferred embodiments, it should be realized that a number of modifications to these teachings may occur to one skilled in the art. By example, other frame and slot formats, numbers of slots per frame, modulation types, types of channel estimators, numbers of symbols, threshold level values and the like may be employed, while still remaining within the ambit of the teachings of this invention.

It is also within the scope of the teaching of this invention to not use a threshold value at all, where the ratio is determined to be above or below the threshold, but to instead simply compare the ratio of the two power estimates ($EST_1/EST_2$) to unity, plus or minus some tolerance value that could be fixed or variable. If the ratio is within the tolerance value of unity then the Q-DTX mode is assumed to inactive, otherwise the Q-DTX mode is assumed to be active.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless terminal in a wireless communication system that operates with frames time divided into slots each having a Header portion followed by a Data portion, wherein the system is arranged to transmit a downlink slot so that the Header portion is transmitted at a higher power level than the Data portion when the Data portion does not contain valid data so as to reduce system interference, comprising steps of:

receiving the Header portion and only a part of the Data portion of a slot and detecting whether the Header portion was transmitted at a higher power level than the Data portion is being transmitted; and if it is detected that the Header portion was transmitted at a higher power level than the Data portion is being transmitted, terminating the reception of a remaining part of the slot and placing at least a portion of the wireless terminal in a reduced power consumption state; else if it is detected that the Header portion was transmitted at the same power level as the Data portion is being transmitted, continuing to receive the remaining part of the slot.

2. A method for operating a wireless terminal in a wireless communication system that operates with frames time divided into slots each having a Header portion followed by a Data portion, wherein the system is arranged to transmit a downlink slot so that the Header portion is transmitted at a higher power level than the Data portion when the Data portion does not contain valid data, comprising steps of:

performing a channel estimation in a forward direction over symbols of a received Header portion to derive a first channel estimate ($EST_1$) at the end of the Header portion;

performing a channel estimation in a reverse direction over a subset of symbols of the Data portion so as to derive a second channel estimate ($EST_2$) at the beginning of the Data portion;

obtaining a ratio of the derived channel estimates ($EST_1/EST_2$); and comparing the ratio to a threshold value to determine if the Data portion contains valid data.

3. A method as in claim 2, wherein if the Data portion is determined not to contain valid data, placing at least a receiver of the wireless terminal in a reduced power consumption state for a remainder of at least the current slot.

4. A method as in claim 2, wherein if the ratio is determined to be about unity, then the Data portion is assumed to contain valid data, and a receiver of the wireless terminal is left in a fully powered, operational state to receive the remainder of the current slot.

5. A method as in claim 2, wherein the steps of estimating use a Least Mean Squares (LMS) channel estimator.

6. A method as in claim 2, wherein the threshold value is fixed during the operation of the wireless terminal.

7. A method as in claim 2, wherein the threshold value is made variable during the operation of the wireless terminal so as to have a value that is a function of at least one influencing factor.

8. A method as in claim 7, wherein the at least one influencing factor is selected from a velocity of the wireless terminal and an amount of at least one of noise or interference in the channel.

9. A method for operating a wireless terminal in a wireless communication system that operates with frames time divided into slots each having in a packet data mode of operation a Header portion followed by a Data portion, wherein the system is arranged to transmit a downlink slot so that the Header portion is transmitted at a higher power level than the Data portion when the Data portion does not contain valid packet data, comprising steps of:

making a determination if a last received N slots contained valid packet data for the wireless terminal;

if the determination is in the affirmative, receiving an entire next slot; else if the determination is in the negative, beginning to receive the next slot and performing a channel estimation in a forward direction over symbols of a received Header portion to derive a first channel estimate ($EST_1$) at the end of the Header portion;

performing a channel estimation in a reverse direction over a subset of symbols of the Data portion so as to derive a second channel estimate ($EST_2$) at the beginning of the Data portion;

obtaining a ratio of the derived channel estimates ($EST_1/EST_2$); and comparing the ratio to a threshold value to determine if the Data portion contains valid packet data.

10. A method as in claim 9, wherein if the Data portion is determined not to contain valid packet data, placing at least a receiver of the wireless terminal in a reduced power consumption state for a remainder of at least the current slot.

11. A method as in claim 9, wherein if the ratio is determined to be about unity, then the Data portion is assumed to contain valid packet data, and a receiver of the wireless terminal is left in a fully powered, operational state to receive the remainder of the current slot.

12. A method as in claim 9, wherein the steps of estimating use a Least Mean Squares (LMS) channel estimator.

13. A method as in claim 9, wherein the threshold value is one of a fixed threshold value or an adaptively varied threshold value.

14. A method as in claim 9, wherein the subset of symbols is comprised of about 10 symbols.

* * * * *